United States Patent
Van Rijn et al.

(10) Patent No.: US 7,422,779 B2
(45) Date of Patent: Sep. 9, 2008

(54) PLASTICS FILM COMPOSED OF RIGID POLYVINYL CHLORIDE (RPVC) AND PROCESS FOR ITS PRODUCTION

(75) Inventors: Cor Van Rijn, Cranendonck (NL); Peter Ras, Burgkirchen (DE); Hans Thijs, Sittard (NL)

(73) Assignee: Kloeckner Pentaplast GmbH & Co. KG, Heiligenroth (DE)

( * ) Notice: Subject to any disclaimer, the term of this patent is extended or adjusted under 35 U.S.C. 154(b) by 422 days.

(21) Appl. No.: 10/791,938

(22) Filed: Mar. 3, 2004

(65) Prior Publication Data

US 2004/0175520 A1    Sep. 9, 2004

(30) Foreign Application Priority Data

Mar. 7, 2003    (DE) ................. 103 09 918

(51) Int. Cl.
*B65B 53/00* (2006.01)
*F16B 4/00* (2006.01)

(52) U.S. Cl. .............. 428/35.1; 428/34.9; 428/220; 428/152

(58) Field of Classification Search ............ 428/35.7, 428/40.1, 36.9, 36.92, 212, 34.9, 35.1, 220, 428/152
See application file for complete search history.

(56) References Cited

U.S. PATENT DOCUMENTS

| | | | | |
|---|---|---|---|---|
| 4,264,010 A | * | 4/1981 | Yoshiga et al. | 206/497 |
| 4,911,994 A | | 3/1990 | Will et al. | 429/167 |
| 5,190,609 A | | 3/1993 | Lin et al. | 156/85 |
| 5,747,192 A | * | 5/1998 | Hughen et al. | 429/163 |

FOREIGN PATENT DOCUMENTS

| | | | |
|---|---|---|---|
| DE | 33 22 309 A1 | | 1/1985 |
| DE | 34 30 162 A1 | | 2/1986 |
| EP | 0 176 704 A1 | | 4/1986 |
| GB | 1186531 | * | 4/1970 |

* cited by examiner

*Primary Examiner*—Michael C Miggins
(74) *Attorney, Agent, or Firm*—ProPat, L.L.C.

(57) ABSTRACT

A plastics film 1 composed of rigid polyvinyl chloride serves as backing film for a sleeve label. The sleeve label can be applied by adhesive bonding and shrinking onto a peripheral surface of the cylindrical body. A protective covering film 2 has been laminated onto the plastics film 1. The plastics film 1 has been stretched in the machine direction of a calender and has a longitudinal heat shrinkage of from 40 to 60%, based on the unstretched plastics film. Perpendicularly to the machine direction of the calender, the heat shrinkage of the plastics film is from 0 to 10%.

16 Claims, 1 Drawing Sheet

PLASTICS FILM COMPOSED OF RIGID POLYVINYL CHLORIDE (RPVC) AND PROCESS FOR ITS PRODUCTION

FIELD OF THE INVENTION

The invention relates to a plastics film composed of rigid polyvinyl chloride (RPVC) as backing film for a single- or multilayer adhesive-bondable sleeve label which can be applied by adhesive bonding and shrinking onto a peripheral surface of a cylindrical body, and to a process for its production.

BACKGROUND OF THE INVENTION

Plastics films of this type form shrink-label base films or shrink-label backing films, these labels being applied by shrinkage onto cylindrical batteries, such as dry-cell batteries. In that process, shrink labels have to be capable of application via heating and shrinkage to appropriate size for a prescribed final configuration, corresponding to the periphery and the face sides of the cylindrical batteries. This shrinkage force arising here has to be withstood by the adhesive with which the shrink label is applied along the periphery.

These base films or backing films are subject to stringent requirements in relation to shrinkage properties, appearance, layflat, number of holes, printability, and minimization of surface defects.

The prior art discloses shrinkable PVC films of U.S. Pat. No. 4,911,994, corresponding to German patent DE 34 30 162 C2 and to German patent 33 22 309 C3.

For example, German patent 33 22 309 C3 describes a multilayer adhesive-bondable sleeve label which can be applied by adhesive bonding and shrinking onto a peripheral surface of a body of a dry-cell battery, and which has a backing having a reverse side with a pressure-sensitive adhesive layer, there being a protective layer on the upper side of the backing. The backing comprises at least one shrinkable plastics film composed of rigid polyvinyl chloride and stretched in the circumferential direction of the body. The protective layer is composed of a shrinkable transparent protective covering film stretched in the circumferential direction of the body. A print has been applied to that side of the backing which faces away from the protective covering film. The protective covering film has been applied to the print by means of a laminating adhesive layer. A layer of material visible through the protective covering film has been vapor-deposited onto the plastics film. Marginal regions of the protective covering film protrude over both margins of the backing in the axial direction of the peripheral surface of the body.

EP-B 0 176 704 describes a shrink label of similar structure in which there is at least one stamped cut in the backing, in the vicinity of its edge extending along a line enveloping the peripheral surface of the body. Once the shrink label has been applied by shrinkage, the edge covers the edge which is parallel thereto.

None of the documents mentioned discloses an extent for the change in the dimension of a plastics film composed of PVC as a result of application by shrinkage onto a cylindrical body.

EP-B1 0 578 750 describes shrink labels composed of polypropylene, where the polypropylene film can undergo heat shrinkage in one dimension by 20% or more at elevated temperatures. The initial shrinkage factor is from 20 to 50% at temperatures in the range from 116 to 138° C. Polypropylene is accompanied by various problems, for example during the printing of markings, during the vapor-deposition of metal layers, and during the application of adhesives. Specific treatments are required to make the abovementioned materials adhere to polypropylene. This makes the production of sleeve labels more expensive than that of PVC-based labels. For example, corona treatment is required for the metallizing of one side of the polypropylene, while the other side of the polypropylene, the side to which the adhesive is applied, also has to be corona-treated, but the corona power used for this is different from that for the corona treatment for the metallization. Priming or surface coating is needed for the printing of polypropylene.

These problems are of substantially smaller magnitude when use is made of plastics films composed of polyvinyl chloride, rather than polypropylene.

It is an object of the invention to provide a calendered plastics film composed of polyvinyl chloride for shrink labels of the type described at the outset, which undergoes a large change in its longitudinal dimension during heat shrinkage. For the purposes of this object, the change in dimension in the transverse direction during heat shrinkage of the plastics film is to be very small.

The invention achieves this object in that the plastics film has been stretched in the machine direction of a calender and has a positive heat shrinkage of from 40 to 60%.

BRIEF SUMMARY OF THE INVENTION

In an embodiment of the invention, the heat shrinkage perpendicularly to the machine direction of the calender is from 0 to 10%, and this means that the length of the film in the transverse direction can increase during the shrinkage process. The film may also have a positive shrinkage of from 0 to 2% perpendicularly to the machine direction of the calender.

According to the invention, the heat shrinkage in that direction of the film running parallel to the machine direction of the calender takes place over a period of 15 minutes at a temperature of from 115 to 125° C. This measurement preferably takes place in air, while measurement of the shrinkage in water is less usual, the selected measurement time in that case then being considerably shorter, and the selected temperature being lower.

The heat-stretching value for the plastics film perpendicularly to the machine direction of the calender is preferably zero. As a consequence of the longitudinal stretching, the plastics film has a negative heat shrinkage of from 0 to 10%, i.e. increases its length by from 0 to 10%, perpendicularly to the machine direction of the calender over a period of from 15 minutes at a temperature of from 115 to 125° C.

In an embodiment of the invention, the plastics film has a thickness of from 18 to 66 µm, resulting from the thickness range of from 20 to 60 µm with a tolerance of ±10%.

Other embodiments of the invention are apparent from the features of claims 7 to 16.

A process for producing a plastics film composed of rigid polyvinyl chloride (RPVC), which is calendered and heat-stretched comprises undertaking the stretching in the machine direction of the calender, and changing the dimension of the plastics film longitudinally by from 40 to 60% of the length of the unstretched plastics film.

In the process, the plastics film is set transversely during the heat-stretching in the machine direction. The manner of achieving this is that the plastics film is transversely set via application under pressure to transport rollers over which it is passed. In an embodiment of the process, a negative transverse heat shrinkage of from 0 to 10% of the width of the unstretched plastics film is established via the thermal stretching in the machine direction, i.e. the longitudinal direction of the plastics film, and the transverse setting of the plastics film. An advantage achieved as a result of this is that a defined positive change in the dimension of the plastics film is achieved in the transverse direction without any need for use of a transverse stretching system. The manner of achieving a positive shrinkage of from 0 to 2% is that pressure-application rollers which are in contact with the transport rollers have been set with an outward-oriented angle, i.e. are not oriented parallel to the machine direction.

BRIEF DESCRIPTION OF THE DRAWINGS

The invention is further illustrated below using examples presented in the form of drawings.

DETAILED DESCRIPTION OF THE INVENTION

Figure 1:
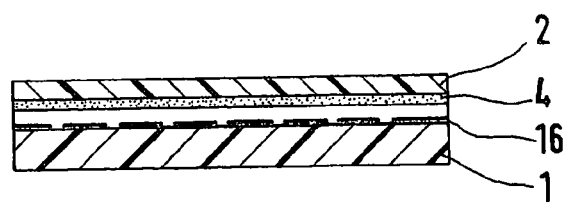
FIG. 1 shows a cross section through a first embodiment of a two-layer plastics film, to the upper side of which a protective covering film has been applied by lamination.

FIG. 1 shows a plastics film 1 to which a protective covering film 2 has been applied by lamination, by means of an adhesive layer 4. The plastics film 1 is composed of a calendered rigid polyvinyl chloride (RPVC) film. The thickness of the plastics film 1 is in the range from 25 to 40 μm, and in particular the film has a thickness of 25, 35, or 37 μm. The protective covering film 2 is likewise composed of rigid polyvinyl chloride, and its thickness is in the range from 10 to 25 μm. Specifically, if the thickness of the plastics film 1 is 25 μm, the thickness of the protective covering film 2 is 25 μm. If the thickness of the plastics film 1 is 35 μm, the thickness of the protective covering film 2 is 20 μm. If the thickness of the plastics film is 37 μm, the thickness of the protective covering film is then from 10 to 20 μm. The upper side of the plastics film has a print 16.

Figure 2:
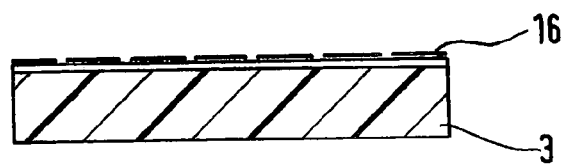
FIG. 2 shows a cross section through a second, single-layer, embodiment of a plastics film.

FIG. 2 shows a plastics film 3 which is a monofilm and which has a thickness of from 50 to 60 μm. This plastics film 3 is composed, like the plastics film 1, of rigid polyvinyl chloride. No protective covering film is required for the plastics film 3. The upper side of the plastics film 3 has been metallized and has also been provided with a print 16.

Figure 3:
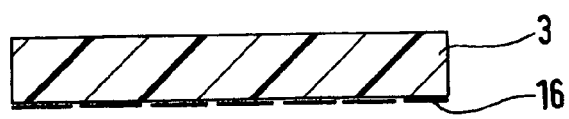
FIG. 3 shows a cross section through a third, single-layer, embodiment of a plastics film.

The plastics film 3 shown in FIG. 3 is a monofilm with a thickness of from 50 to 60 μm, and is composed of rigid polyvinyl chloride. The film 3 has not been metallized, and its lower side has a print 16.

The embodiments shown in FIGS. 1 to 3 of the plastics films are used to manufacture sleeve labels, the lower side of which is, by way of example, applied by adhesive bonding to cylindrical articles.

The widths of the films are up to 2010 mm. The plastics films 1 and 3 therefore have a thickness range of from 25 to 60 μm with a thickness tolerance of ±10%, enabling the actual thicknesses of the plastics films 1 and 3 to range from 22.5 to 66 μm.

When the plastics films 1 and 3 are used as backing layers for sleeve labels, they are subject to stringent requirements in relation to their shrinkage properties, appearance, layflat, freedom from holes, the printing of the film, the lamination of the printed film, and its metallization.

The process of shrinking onto a cylindrical body, such as a cylindrical dry-cell battery, necessitates shrinkage which has to lie within the range from 40 to 60% in the longitudinal direction of the plastics film. As is known, heat shrinkage of a plastics film is produced by stretching at elevated temperatures and then quenching the film, or very rapid lowering of the temperature. If a shrinkable plastics film of this type is then heated, it shrinks in the direction of stretching. There is to be minimum change in dimension in the transverse direction of the plastics films 1 and 3 during the process of heat shrinkage, and this change is not to exceed a range of from 0 to 10% of the width of the unstretched plastics films 1 and 3.

The adhesive layer 4 in FIG. 1 is composed of a flexible adhesive which ensures reliable securing of the protective covering film to the plastics film 1 during the shrinkage process. For this purpose, use may be made of contact adhesives, including rubber- or acrylic-based adhesives.

Since one side of the plastics films 1 and 3 is generally metallized, the number of surface defects, which can never be eliminated completely, has to be minimized or only extremely small. Among these surface defects are fish-eyes, black spots, depressions, and scratches. Metallizing makes these defects clearly discernible.

The metallizing and coating of the plastics films 1 and 3 takes place across the entire film width of up to 2000 mm, and the requirements for layflat are therefore very stringent.

If the layflat of the film is inadequate, unevenness arises in the metallizing and coating, and each further processing step leads to further impairment of the appearance of the films, thus then increasing the rejection rate for the films.

Within the prescribed thickness range for the plastics films 1 and 3, it is impossible to produce a rigid polyvinyl chloride film completely free from holes. Holes lead in particular to problems during the coating process and during the metallizing process, and if the labels are produced from films with holes they are unusable and have to be separated from the other labels. In order to keep the rejection rate low, it is desirable that the number of holes in the plastics films be extremely small. The number of holes with a diameter of from 2 to 6 mm per 1000 $m^2$ of film surface has to be relatively small and must not exceed 10. A similar criterion applies to the number of holes with a diameter of from greater than 6 to 50 mm per 1000 $m^2$ of film surface. The number of these is smaller than or equal to 5.

These stringent requirements placed upon the quality of plastics films 1 and 3 which are processed to give sleeve labels are a consequence of the large number of processing steps through which the material has to pass for the production of sleeve labels. These processing steps are the calendering of the film, metallizing, where appropriate lacquering of the metallized film with a lacquer, coating and lamination of the film, cutting, printing, and lamination of the printed film, production of the sleeve labels, and applying the labels by shrinkage to cylindrical bodies, for example to cylindrical dry-cell batteries.

The plastics films 1 and 3 are preferably glass-clear, and may, if desired, also have been colored. They preferably comprise a lubricant to improve processability.

Figure 4:
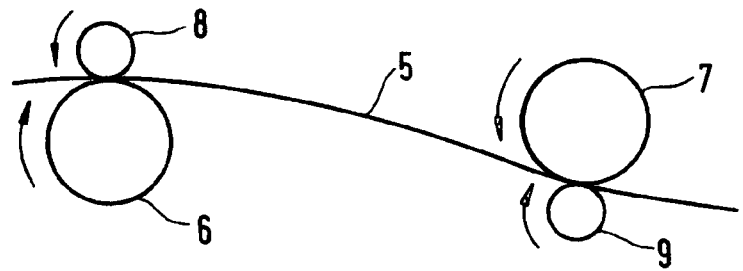
FIG. 4 shows a detail of the transport path of the plastics film during its stretching in the machine direction of the calender.

The plastics films 1 and 3 are calendered in a known manner from rigid polyvinyl chloride and stretched at temperatures of from 180 to 60° C. The stretching takes place in the machine direction of the calender, and the dimensional change here in the longitudinal direction of the plastics films 1 or 3 is from 40 to 60% of the length of the unstretched plastics films. During the heat stretching in the machine direction, the plastics film 1, 3 is set transversely. The manner of achieving this is that the plastics film 1 or 3 is set in its transverse direction via application of pressure to transport rollers 6, 7 by means of pressure-application rollers 8, 9 (see FIG. 4). The negative transverse heat shrinkage of the plastics films 1 and 3 is consequently very small, and is in the range from 0 to 10%, based on the unstretched film. A transverse heat shrinkage of from 0 to 10% of the width of the unstretched plastics film is established via the thermal stretching in the machine direction, i.e. the longitudinal direction of the plastics film 1 or 3, and the transverse setting of the plastics film 1, 3.

Shrinkable sleeve labels which are self-adhesive are used in various configurations. The sleeve label may have been laminated and comprise a metallizing layer or individual metallized effects, or else printed graphics between two layers, if the plastics film 1 of the first example of FIG. 1 is used. If a monofilm of the second embodiment as in FIG. 2 is used for the sleeve label, prints 16 in the form of graphics may have been applied to the upper side or lower side of the plastics film 3. To protect these graphics on the upper side, a suitable lacquer or some other protective layer is then applied to the surface of the images.

Figure 5:
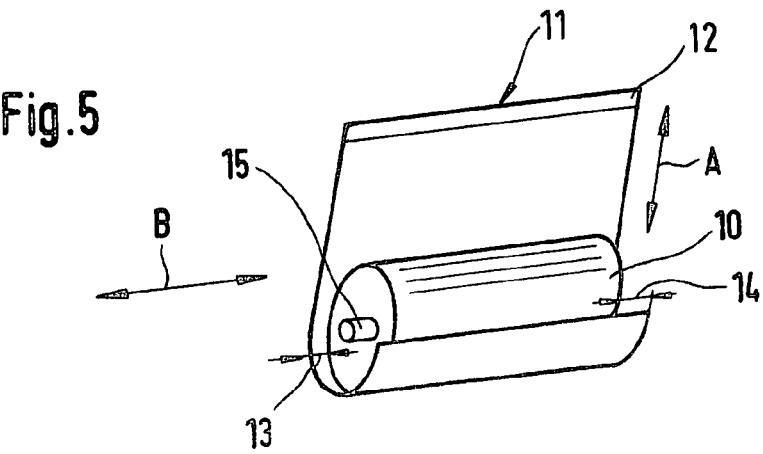
FIG. 5 shows a perspective view of a sleeve label which has, as backing film, the plastics film of FIG. 1 or 2, prior to the process of winding around a cylindrical body.

FIG. 5 shows the sleeve label 11 which is applied to a cylindrical body 10, by way of example a dry-cell battery. To improve clarity, the sleeve label 11 has been shown partially rolled onto the cylindrical body. That part of the sleeve label applied to the cylindrical body 10 by adhesive bonding adheres by way of an adhesive layer. The sleeve label 11 is heat-shrinkable in the longitudinal direction indicated by the double arrow A. In the transverse direction indicated by the double arrow B, marginal areas 13 and 14 of the sleeve label 11 protrude over the length of the cylindrical body 10. At the upper margin of the sleeve label 11 there is a pressure-sensitive adhesive strip 12 which permits adhesive bonding along the line enveloping the sleeve label 11 after complete rolling or winding of the sleeve label 11 around the cylindrical body 10.

Because the marginal areas 13 and 14 protrude, the face sides or terminal surfaces of the cylindrical body 10 are enclosed partially or enveloped partially during the application of the sleeve label 11 by shrinkage. Since the transverse shrinkage of the sleeve label 11 in the direction of the double arrow B is very small, namely, as described above, in the range from 0 to 10%, it is certain that the terminal surfaces of the cylindrical body 10 continue to be protectively covered by the sleeve label 11 after the process of application by shrinkage, and that in the central region of the cylindrical body 10, where in the case of a dry-cell battery there is a battery terminal 15, the sleeve label 11 is closely adjacent to the same. Once the sleeve label 11, which has high heat shrinkage in the longitudinal direction, i.e. in the direction of the double arrow A, has been rolled around the cylindrical body 10 and has been fixed by means of the pressure-sensitive adhesive strip 12, a shrink tunnel not shown is used for heating and resultant heat shrinkage of the sleeve label 11. As mentioned above, in the case of a dry-cell battery the sleeve label 11 shrinks around the battery terminal 15, as a consequence of the longitudinal heat shrinkage of the sleeve label 11.

In the case of a two-layer sleeve label 11, the heat shrinkage is determined predominantly by the plastics film 1, whereas the design of the protective covering film 2 is such that its shrinkage is approximately the same as that of the plastics film 1. It may in particular also have less shrinkage than the plastics film 1.

If the sleeve label 11 is composed of a monofilm, a particular requirement is that the negative transverse shrinkage be greater than 0%, namely in the range from about 5 to 8%. If a monofilm of this type, namely the plastics film 3, is printed, crosslinking occurs during the printing process and inhibits shrinkage. To that extent, the shrinkage of a monofilm of this type with a thickness of from 50 to 60 μm is different from that of the relatively thin plastics film 1, in the case of which the transverse shrinkage is, if possible, to be about 0%. In the case of the monofilm, a printing ink layer on the lower side of the monofilm inhibits shrinkage. To compensate for this, the transverse heat shrinkage of the monofilm 3 is required to be somewhat greater than that of the film 1.

What is claimed is:

1. A calendered plastics film composed of rigid polyvinyl chloride, wherein the plastics film has a width up to about 2010 mm, and the plastics film has been stretched alone at temperatures of from 180 to 60° C. in the machine direction of a calender, and has a positive heat shrinkage of from 40 to 60% in that direction of the plastics film running parallel to the machine direction of the calender, as measured over a period of about 15 minutes at a temperature of from about 115 to 125 C. wherein the number of holes with a diameter of from about 2 to 6 mm is smaller than or equal to about ten per 1 000 $m^2$ of film surface.

2. The plastics film as claimed in claim 1, wherein perpendicularly to the machine direction of the calender the negative heat shrinkage of the plastics film is from 0 to 10%, as measured over a period of about 15 minutes at a temperature of from about 115° to 125° C.

3. The plastics film as claimed in claim 1, wherein perpendicularly to the machine direction of the calender the plastics film has a positive heat shrinkage of from about 0 to 2%.

4. The plastics film as claimed in claim 1, wherein the heat-stretching value for the plastics film perpendicularly to the machine direction of the calender is about zero.

5. The plastics film as claimed in claim 1, wherein the number of holes with a diameter of from greater than 6 to 50 mm is smaller than or equal to about five per 1 000 $m^2$ of film surface.

6. The plastics film as claimed in claim 1, which is glass-clear.

7. The plastics film as claimed in claim 1, which has been colored white.

8. The plastics film as claimed in claim 1, which comprises a lubricant for improving its processability.

9. The plastics film as claimed in claim 1, wherein said film is metallized.

10. The plastics film as claimed in claim 1, wherein said film is a monofilm and perpendicularly to the machine direction of the calender the plastics film has a negative heat shrinkage of from about 5 to 8%.

11. The plastics film as claimed in claim 1, wherein said film consists of one rigid polyvinyl chloride film, metallization, and, optionally, one or more of coating, lacquer and printing.

12. The plastics film as claimed in claim 1, whose thickness is from about 22.5 to 66 μm.

13. The plastics film as claimed in claim 12, which is a monofilm whose thickness is about 50 or about 60 μm, the thickness tolerance in each case being ±10%.

14. The plastics film as claimed in claim 12, whose thickness is about 25, about 35, or about 37 μm, wherein in each case a protective covering film composed of rigid polyvinyl chloride, with a thickness of about 25, about 20, and, respectively, from about 10 to 20 μm has been applied by lamination to the upper side of the plastics film.

15. The plastics film as claimed in claim 1, which has been calendered and stretched longitudinally, that is in the machine direction of a calender, and which has been transversely set during the longitudinal stretching.

16. The plastics film as claimed in claim 15, whose upper or lower side comprises a metallizing layer composed of aluminum or of another metal or of a metal alloy, said metal or metal alloy selected from the group copper; brass, bronze and alloys thereof.

* * * * *